Nov. 9, 1948. D. GREGG ET AL 2,453,217
SCAVENGING OIL SYSTEM FOR ENGINES
Filed April 13, 1944 2 Sheets-Sheet 1

INVENTORS
David Gregg
Henry Troeger
BY
Herbert L. Davis, Jr.
ATTORNEY

INVENTORS
David Gregg
BY Henry Troeger

Herbert L. Davis Jr.
ATTORNEY

Patented Nov. 9, 1948

2,453,217

UNITED STATES PATENT OFFICE 2,453,217

SCAVENGING OIL SYSTEM FOR ENGINES

David Gregg, Caldwell, and Henry Troeger, Ramsey, N. J., assignors to Bendix Aviation Corporation, Teterboro, N. J., a corporation of Delaware Application April 13, 1944, Serial No. 530,880

4 Claims. (Cl. 184—6)

Our present invention relates to scavenging oil systems for engines and more particularly to a novel system for returning oil from the crank case of an aircraft engine to an oil supply tank in such a manner as to prevent foaming of the oil.

Heretofore the oil pump handling the scavenging oil returned from the crank case to the oil tank has necessarily been of greater capacity than the quantity of oil actually handled or provided by the supply pump. Thus, in such cases, air becomes entrained, during the pumping operation, with the return oil so as to cause the formation of an emulsion or foaming of the oil, which frequently causes difficulty particularly in high altitude operations and in the case of unusually hot oil.

An object of our invention, therefore, has been to provide a novel system whereby air may be prevented, during the pumping operation, from becoming entrained in the return oil.

Another object of our invention is to provide a novel system whereby foaming of the return scavenging oil may be eliminated.

The above and further objects and novel features of this invention will more fully appear from the following detailed description and the accompanying drawings wherein like reference characters refer to like parts in the several views. It is to be expressly understood, however, that the drawings are for the purpose of illustration only and are not designed as a definition of the limits of the invention, reference being had for this purpose to the appended claims.

Figure 1:
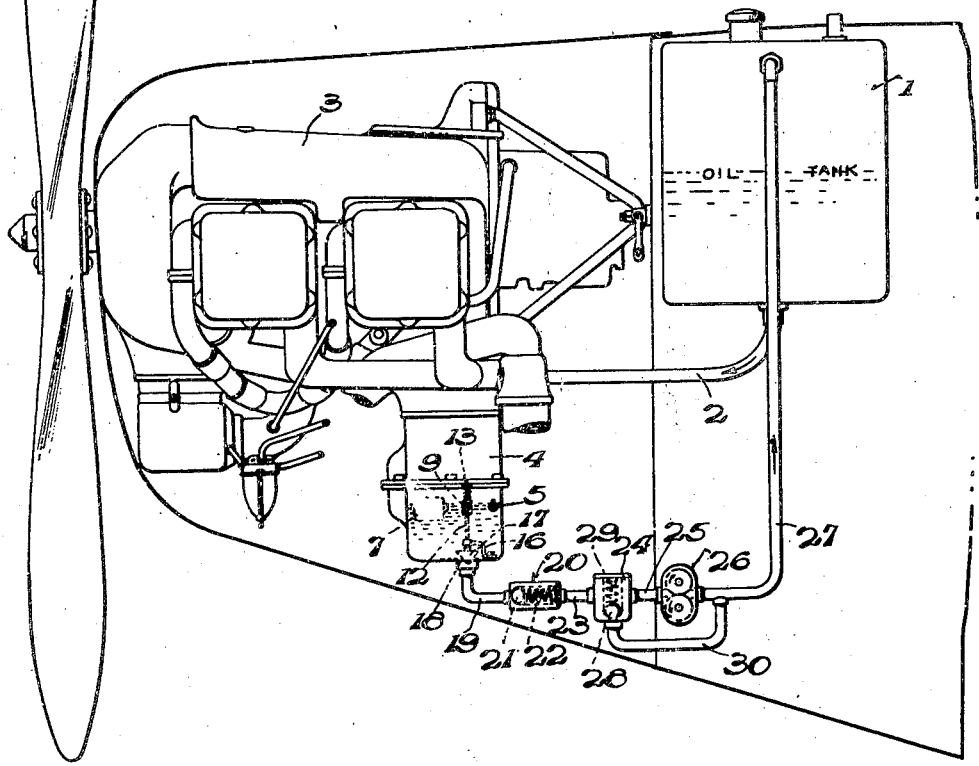
Figure 1 is a diagrammatic view illustrating one arrangement of our novel scavenging oil return system.

Referring to the form of our invention illustrated in Figure 1, numeral 1 indicates a suitable oil supply tank from which oil is drawn by a suitable pump not shown through a conduit indicated by numeral 2 to an aircraft engine indicated generally by the numeral 3. Numeral 4 indicates an oil sump for collecting return oil from the engine.

Figure 2:
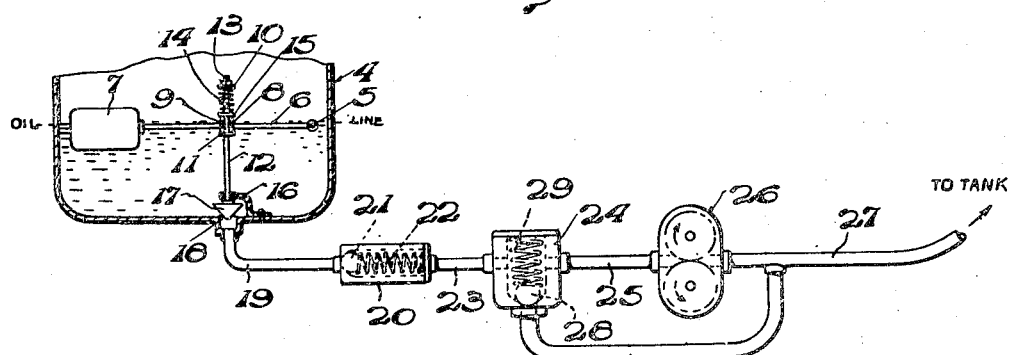
Figure 2 is an enlarged fragmentary side view of the operating mechanism of Figure 1.

As shown in Figure 2 there is pivotally mounted at 5 within the oil sump a rod 6 having positioned at the free end thereof, a float 7. Positioned on the rod 6 intermediate the float 7 and pivot 5 is a bracket 8 pivotally connected to the rod 6 by a bolt 9. The bracket 8 has slidably mounted in bracket portions 10 and 11 a rod 12. The rod 12 has provided at one end thereof a nut 13 engaging the bracket portion 10 so as to limit the movement of the rod 12. There is further provided a cushioning spring 14 acting at one end against the member 15 fixed to the rod 10 and acting at the opposite end against the portion 10 of the bracket 8. The rod 12 is slidably mounted in position by an arm 16 affixed to the bottom of the sump 4. There is affixed at the opposite end of the rod 10 a valve member indicated by the numeral 17 which is arranged to control an outlet opening in the sump 4 indicated by the numeral 18. A conduit 19 leads from the outlet opening 18 to a check valve indicated by the numeral 20 which is arranged to prevent the back flow of oil into the sump 4. The check valve 20 has provided therein a ball valve member 21 biased by a spring member 22 in a direction so as to oppose flow of oil from outlet opening 18. However, upon the pressure exerted upon the ball valve 21 being of sufficient value the same is arranged to open and permit flow through the valve 20 and out an outlet conduit 23. The outlet conduit 23 leads from the valve 20 to a second spring loaded check valve indicated by the numeral 24. A second conduit 25 leads from the check valve 24 to an oil pump which may be of any suitable type and indicated by the numeral 26. The pump 26 may be driven from the main engine or suitable auxiliary motor means may be employed.

An outlet conduit 27 leads from the pump 26 to a return opening formed in the supply tank 1. The check valve 24 has provided a ball valve 28 biased by a spring 29 in a manner so as not to interfere with the flow of oil through the check valve 24 from the conduit 23 to the conduit 25, but arranged to prevent the flow of oil from such conduits into a third conduit indicated by the numeral 30. The third conduit 30 serves as a by-pass conduit leading from the outlet conduit 27 around the pump 26 to the check valve 24.

The spring 29 of check valve 24 exerts a greater resistance to the opening of the ball valve 28 than the spring 22 exerts upon the ball valve 21 of check valve 22. Moreover, the resistance to the opening of the ball valve 28 is greater than the resistance to the flow of oil through the opening 18 when the valve 17 is fully opened. However, as the valve 17, in response to a drop in the oil level, moves in a valve closing direction so as to decrease the size of the opening 18, there is an increase in the resistance to the flow of a sufficient quantity of oil through the opening 18 to satisfy the capacity of the pump 26. At a predetermined adjusted position of the valve 17 such resistance to the flow of oil through the opening 18 increases to a value sufficient to over balance the resistance of the biasing spring 29 acting upon the ball valve 28, whereupon the suction force exerted by the pump 26 tends to draw the ball valve 28 to an open position against the biasing force of the spring 29, causing a portion of the oil passing into the outlet conduit 27 from the pump 26 to be drawn through the conduit 30, valve 24 and conduit 25 into the pump 26 together with the oil supplied directly through the outlet 18 so that the excess capacity of pump 26 over the flow of oil passing through the opening 18 is satisfied by recirculating oil through the by-pass valve 24.

However, upon the valve 17 being closed, upon a predetermined drop in the oil level within the sump 4, oil will be drawn by the pump 26 entirely through the by-pass conduit 30 and check valve 24, but no air will be drawn into the oil by the pump 26, since the valve 17 will close the opening 18 from the sump 4 before the oil level reaches the opening 18, so that the pump 26 will not tend to draw part oil and part air, but will operate with recirculating oil. Thus the total effective return of the pump 26 will substantially equal the oil drawn from the supply tank so that there will be no excess loading of the engine oil return system, since there will be effected the return of oil only to the supply tank 1, rather than the return of part air and part oil. Therefore, the oil returned to the oil tank 1 will not contain entrained air, which air would otherwise cause foaming in the returned oil.

Figure 3:
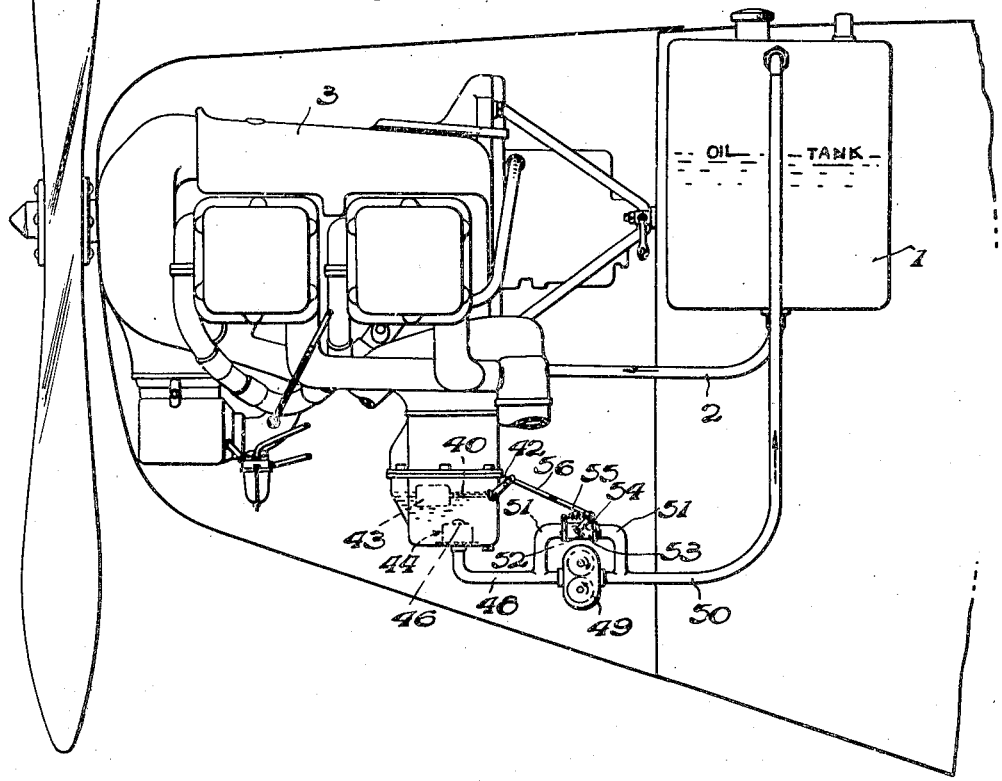
Figure 3 is a diagrammatic view of a second form of our novel system for returning scavenging oil.
Figure 4:
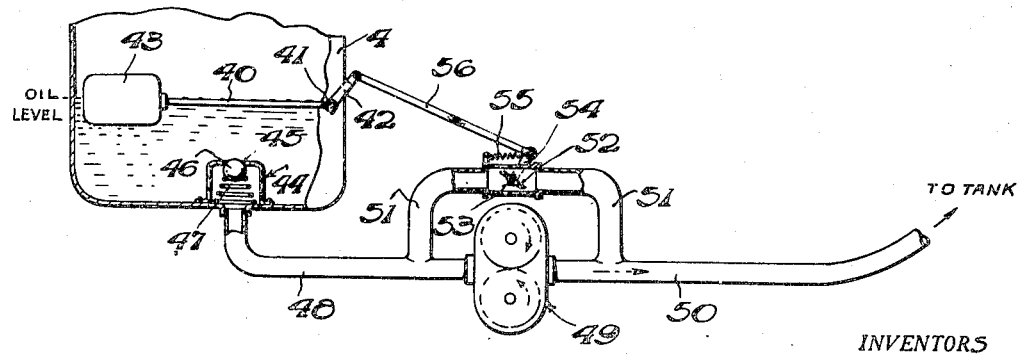
Figure 4 is an enlarged fragmentary side view of the operating mechanism of Figure 3.

The second form of our invention is illustrated in Figures 3 and 4 wherein there is provided a similar oil sump 4 having therein a rod 40 pivoted at one end on a shaft 41 to which there is affixed a lever arm 42. At the opposite end of the rod 40 there is provided a float indicated by the numeral 43. Thus increase or decrease in the oil level of the sump 4 will effect a movement of the arm 40 for a purpose which will be explained hereinafter.

A valve 44 controls the outlet of the sump 4. The valve 44 has an outlet opening 45 provided in the same. A ball valve indicated by numeral 46 is biased by a spring 47 so as to close the opening 45. The spring 47 biases the ball valve 46 in a direction opposing passage of the oil into the outlet opening 45. A conduit 48 connects the outlet opening 45 to an oil pump of suitable type indicated by the numeral 49. The oil pump 49 has provided an outlet conduit 50 leading to the return opening of the oil tank indicated by the numeral 1. A by-pass conduit indicated by numeral 51 leads from the oil pump inlet conduit 48 to the oil pump outlet conduit 50. Positioned in the by-pass conduit 51 is a valve 52 pivotally mounted therein on a shaft 53 to which there is affixed an arm 54. The arm 54 is biased in a valve opening direction by a spring indicated by the numeral 55. A rod 56 connects the arm 54 to the arm 42 provided on the float controlled arm 40.

In operation it will be seen that by closing the valve 52 the capacity of the pump 49 for drawing oil from the sump 4 will be increased. Thus upon the oil level of the sump 4 rising, the float 43 will cause arm 42 to adjust the valve 52 so as to increase the capacity of the pump 49 for drawing oil from the sump 4 by limiting the supply of recirculating oil provided through conduit 51 and thus cause the withdrawal of a greater quantity of oil from the sump 4.

Likewise, upon a decrease in the oil level the control valve 52 will be moved so as to decrease the capacity of the pump 49 for drawing oil from the sump 4 by increasing the supply of recirculating oil provided through conduit 51. Finally, upon the oil level reaching a predetermined low point, the valve 52 is opened sufficiently wide as to cause the suction force exerted by the pump 49 upon the ball valve 46 to be insufficient to open the valve 46 against the biasing force of the spring 47, in which case no oil will be drawn from the sump 4, but the oil from the outlet conduit 50 of the pump 49 will rather then provide the entire oil supply for the pump 26 which supply will be by-passed through the conduit 51 to the inlet conduit 48 of the pump 49.

The system is so arranged that the pump 49 cannot draw air together with oil through valve opening 45, but rather before the oil level reaches a point where air may be drawn into the valve opening 45 the ball valve 46 will close the opening 45 so as to prevent air from being drawn through the opening 45. Therefore, the oil returned to the tank 1 will not contain entrained air and accordingly a formation of an oil and air emulsion or foaming of the same will be prevented.

Although only two embodiments of the invention have been illustrated and described, various changes in the form and relative arrangement of the parts, which will now appear to those skilled in the art, may be made without departing from the scope of the invention. Reference is, therefore, to be had to the appended claims for a definition of the limits of the invention.

What is claimed is:

1. A system for returning engine oil to an oil supply tank, whereby foaming of the oil may be eliminated, comprising, in combination, a sump for collecting oil from the engine, a pump for returning the oil from the sump to the supply tank, control means responsive to the quantity of oil collected in the sump for regulating the withdrawal of the oil from said sump, a by-pass conduit leading from the outlet of said pump to the inlet thereof, a valve member for controlling said conduit, spring tension means arranged so as to bias said valve member in a conduit closing direction and in opposition to a suction force exerted on said valve member by said pump.

2. A scavenging oil system for aircraft engines, comprising, in combination, an oil supply tank, means for conducting oil from said supply tank to said engine for scavenging said engine, a sump for collecting said scavenging oil from said engine, a pump for drawing oil from said sump, an outlet conduit leading from said sump to said pump, a first valve means for said outlet, float means responsive to the level of the oil within said sump, said float means being operably connected to said first valve means so as to close the said outlet upon the level of the oil in said sump dropping to a predetermined low level, an outlet conduit leading from said pump to said supply tank, a return conduit leading from the outlet conduit of said pump to the inlet of said pump, and a second valve means provided in said return conduit and arranged to open upon a predetermined suction force being exerted by said pump on said second valve means so as to cause the recirculation of oil from said pump outlet to said pump inlet, whereby said pump is prevented from drawing air through the outlet of said sump.

3. A scavenging oil system for aircraft engines, comprising, in combination, an oil supply tank, means conducting the oil from said supply tank to said engine for scavenging said engine, a sump for collecting said scavenging oil from said engine, a pump for drawing oil from said sump, an outlet conduit leading from said sump to said pump, a first valve means for controlling said outlet, said valve means opening said outlet upon a predetermined suction force being exerted by said pump upon said first valve means, an outlet conduit leading from said pump to said supply tank, an oil return conduit leading from the outlet of said pump to the inlet of said pump, a second valve means for regulating the flow of oil through said return conduit from said pump outlet to said pump inlet, and float means responsive to the level of the oil within said sump and operably connected to said second valve means for varying the flow of oil through said oil return conduit in such a manner as to effect a decrease in the oil flow through the oil return conduit to said pump inlet upon a rise in the oil level within said sump, and to increase the oil flow through the oil return conduit to said pump inlet upon a drop in the oil level within said sump, and thereby preventing said pump from drawing air through the outlet of said sump.

4. A system for returning engine oil to an oil supply tank, whereby foaming of the oil may be eliminated, comprising, in combination, means for collecting oil from the engine, a pump for returning the oil from the collecting means to the supply tank, means for recirculating a portion of said return oil through said pump, a float means responsive to the quantity of oil in said collecting means, a first valve member operated by said float means and arranged to control flow of oil to said pump so as to affect said recirculating means, a second valve member arranged to control flow of oil to said pump, said second valve member opening in response to a suction force exerted by said pump in excess of a predetermined value, means biasing said second valve member in a sense opposing the suction force exerted by said pump, and said biasing means arranged to close said second valve member upon the suction force applied by said pump to said second valve member decreasing below a predetermined value, and one of said valve members directly controlling the flow of oil through said recirculating means to said pump and the other of said valve members directly controlling the flow of oil from said collecting means to said pump so as to prevent said pump from drawing air through said oil collecting means.

DAVID GREGG.
HENRY TROEGER.

REFERENCES CITED

The following references are of record in the file of this patent:

UNITED STATES PATENTS

| Number | Name | Date |
| --- | --- | --- |
| 2,354,693 | Martin | Aug. 1, 1944 |

FOREIGN PATENTS

| Number | Country | Date |
| --- | --- | --- |
| 512,991 | Great Britain | Oct. 2, 1939 |
| 552,255 | Great Britain | Mar. 30, 1943 |
| 693,129 | Germany | July 3, 1940 |